United States Patent
Jung et al.

(10) Patent No.: US 9,459,901 B2
(45) Date of Patent: Oct. 4, 2016

(54) SYSTEM AND METHOD FOR THE PROGRAMMATIC RUNTIME DE-OBFUSCATION OF OBFUSCATED SOFTWARE UTILIZING VIRTUAL MACHINE INTROSPECTION AND MANIPULATION OF VIRTUAL MACHINE GUEST MEMORY PERMISSIONS

(71) Applicant: FireEye, Inc., Milpitas, CA (US)

(72) Inventors: Robert Jung, Albuquerque, NM (US); Antony Saba, Albuquerque, NM (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 13/892,800

(22) Filed: May 13, 2013

(65) Prior Publication Data

US 2014/0189882 A1 Jul. 3, 2014

Related U.S. Application Data

(60) Provisional application No. 61/747,796, filed on Dec. 31, 2012, provisional application No. 61/747,114, filed on Dec. 28, 2012.

(51) Int. Cl.
| | |
|---|---|
| *G06F 9/455* | (2006.01) |
| *G06F 21/14* | (2013.01) |
| *G06F 21/53* | (2013.01) |
| *G06F 21/56* | (2013.01) |

(52) U.S. Cl.
CPC ........... *G06F 9/45558* (2013.01); *G06F 21/14* (2013.01); *G06F 21/53* (2013.01); *G06F 21/566* (2013.01); *G06F 2009/45591* (2013.01)

(58) Field of Classification Search
CPC .... G06F 21/14; G06F 9/45558; G06F 21/56; G06F 21/566; G06F 21/53; G06F 2009/45591
USPC .......................................................... 726/24
See application file for complete search history.

(56) References Cited

U.S. PATENT DOCUMENTS

| | | | |
|---|---|---|---|
| 7,383,443 | B2 | 6/2008 | Zeman et al. |
| 7,937,387 | B2 | 5/2011 | Frazier et al. |
| 8,069,484 | B2 | 11/2011 | McMillan et al. |
| 8,104,089 | B1 * | 1/2012 | Guo et al. ........... 726/24 |
| 8,151,352 | B1 | 4/2012 | Novitchi |
| 8,566,476 | B2 | 10/2013 | Shiffer et al. |
| 8,713,681 | B2 | 4/2014 | Silberman et al. |
| 8,793,278 | B2 | 7/2014 | Frazier et al. |
| 8,881,271 | B2 | 11/2014 | Butler, II |
| 8,949,257 | B2 | 2/2015 | Shiffer et al. |

(Continued)

FOREIGN PATENT DOCUMENTS

KR 10-2010-0010749 4/2011

OTHER PUBLICATIONS

PCT/US13/77799 filed Dec. 26, 2013 International Search Report and Written Opinion dated Apr. 28, 2014.

(Continued)

*Primary Examiner* — Joseph P Hirl
*Assistant Examiner* — J. Brant Murphy
(74) *Attorney, Agent, or Firm* — Rutan & Tucker, LLP

(57) ABSTRACT

A system and method operable to programmatically perform runtime de-obfuscation of obfuscated software via virtual machine introspection and manipulation of virtual machine guest memory permissions.

24 Claims, 1 Drawing Sheet

(56) References Cited

U.S. PATENT DOCUMENTS

| | | | |
|---|---|---|---|
| 9,106,630 B2 | 8/2015 | Frazier et al. | |
| 9,213,651 B2* | 12/2015 | Malyugin | G06F 12/1027 |
| 9,268,936 B2 | 2/2016 | Butler | |
| 9,275,229 B2 | 3/2016 | LeMasters | |
| 2005/0172337 A1 | 8/2005 | Bodorin et al. | |
| 2007/0283115 A1* | 12/2007 | Freeman | G06F 12/1475 |
| | | | 711/163 |
| 2008/0168562 A1* | 7/2008 | Haga | G06F 21/14 |
| | | | 726/23 |
| 2008/0320594 A1* | 12/2008 | Jiang | 726/24 |
| 2010/0191888 A1* | 7/2010 | Serebrin | G06F 9/4812 |
| | | | 710/269 |
| 2010/0333090 A1* | 12/2010 | Wright | G06F 9/45516 |
| | | | 718/1 |
| 2011/0082962 A1* | 4/2011 | Horovitz | G06F 11/301 |
| | | | 711/6 |
| 2012/0011508 A1* | 1/2012 | Ahmad | G06F 12/1009 |
| | | | 718/1 |
| 2012/0254995 A1* | 10/2012 | Sallam | 726/22 |
| 2013/0179971 A1* | 7/2013 | Harrison | 726/23 |

OTHER PUBLICATIONS

A Virtual Machine Introspection Based Architecture for Intrusion Detection, Rosenblum et al., 2003.

EP 13866903.1 filed Dec. 26, 2013 Extended European Search Report dated Jun. 17, 2016.

Garfinkel, T. et al. "A Virtual Machine Introspection Based Architecture for Intrusion Detection" Proceedings of the Symposium on Network and Distributed Systemsecurity, Feb. 6, 2003 (Feb. 6, 2003).

\* cited by examiner

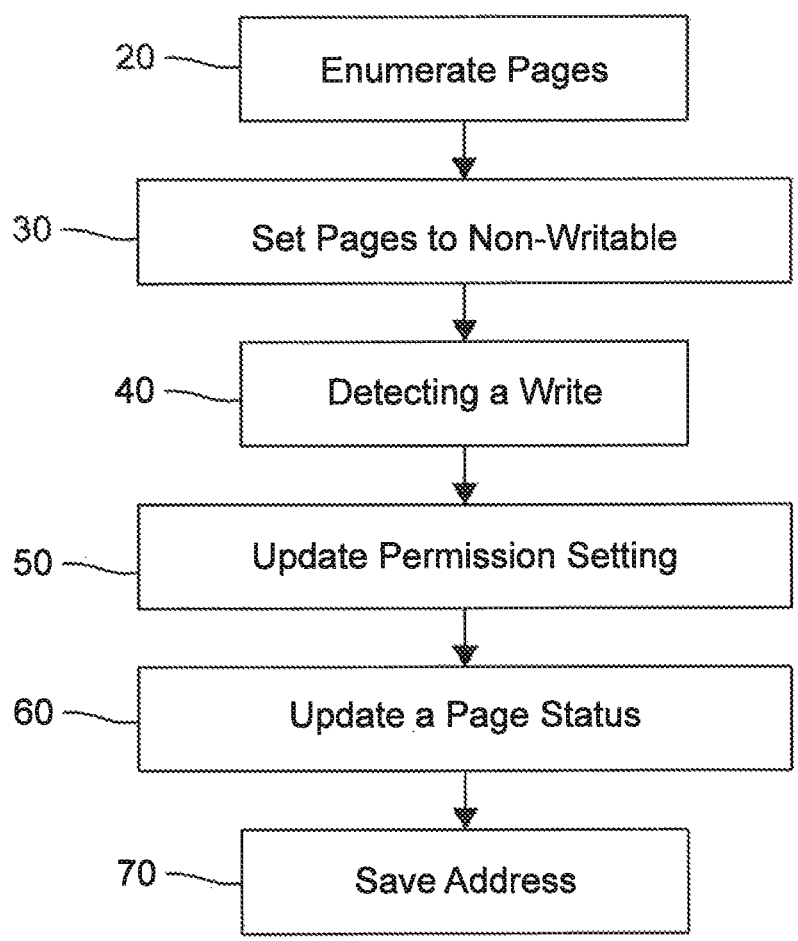

SYSTEM AND METHOD FOR THE PROGRAMMATIC RUNTIME DE-OBFUSCATION OF OBFUSCATED SOFTWARE UTILIZING VIRTUAL MACHINE INTROSPECTION AND MANIPULATION OF VIRTUAL MACHINE GUEST MEMORY PERMISSIONS

CROSS-REFERENCE TO RELATED APPLICATION

This Patent Application claims priority to U.S. Patent Application Ser. No. 61/747,796 filed Dec. 31, 2012, and titled System and Method for the Programmable Runtime De-Obfuscation of Intentionally Obfuscated Software Utilizing Virtual Machine Introspection and Manipulation of Virtual Machine Guest Memory Permissions, and U.S. patent application Ser. No. 61/747,114 titled System And Method To Create A Number Of Breakpoints In A Virtual Machine Via Virtual Machine Trapping Events, and filed Dec. 28, 2012, the entire contents of which are incorporated herein by reference in their entireties.

BACKGROUND

1. Field

The present inventive concept pertains to a system and method to decode obfuscated software. The present inventive concept more particularly concerns a system and method to programmatically runtime de-obfuscate intentionally obfuscated software via virtual machine introspection and manipulation of virtual machine guest memory permissions.

2. Discussion of Related Art

The information security industry routinely seeks to reverse engineer malicious software to determine what malicious behaviors could have been executed on compromised hosts. This process involves the step of taking executable code of the malicious software and disassembling or decompiling to take a higher level view of its functionality.

Reverse engineering malicious software is made more difficult by the standard practice of malware authors of obfuscating executable code as malicious binaries to prevent analysis. According to existing obfuscation strategies, executable code of the malicious software is encoded in a way that makes it unrecognizable as executable code by a disassembler or analyst attempting to perform manual analysis of the malicious software. This process is commonly referred to as "packing." At runtime, when the malicious software executes, the obfuscated executable code of the malicious software is programmatically decoded and then executed. This process of attempting to turn the obfuscated executable code into the form that will be executed is referred to as "unpacking."

At present, there are hundreds of different publicly available software libraries and algorithms that are commonly used by malware authors to accomplish obfuscation. Many of these obfuscation strategies utilize tools which can help make obfuscated code appear different for each unique instance on each infected computer system, for example random number generators.

There are presently a limited number of tools available to detect and de-obfuscate malicious code, but these tools are only effective where certain strategies were used to accomplish obfuscation. These tools are of limited, if any, efficacy in de-obfuscating code obfuscated by other strategies. As a result, the process of analyzing many instances of obfuscated software is often a time consuming, difficult, and manual process that requires specialized reverse engineering expertise. Thus, there is a need for an improved system and method operable to programmatically decode obfuscated software thereby providing increased efficiency.

SUMMARY

The present inventive concept described herein remedies the aforementioned problems by providing a unique system and method operable to programmatically perform runtime de-obfuscation of obfuscated software via virtual machine introspection and manipulation of virtual machine guest memory permissions. The system and method of the present inventive concept is operable to automate the process of de-obfuscating obfuscated malicious software, including by using features commonly exposed in hardware-assisted virtualization platforms.

The aforementioned may be achieved in an aspect of the present inventive concept by providing a method to de-obfuscate obfuscated malicious software. In an aspect of the present inventive concept, the system and method observe a particular piece of analyzed software code, which may be identified and enumerated through at least one of reviewing process tracking structures and matching byte strings in binary executable. The method further includes the step of enumerating a physical page associated with a virtual address space of a piece of analyzed software code. The physical page may be enumerated by traversing a page table to identify physical pages allocated for use by the analyzed software code. The method further includes the step of setting the physical page permission to non writable, which step may be triggered by execution of the analyzed software code. The method still further includes the step of detecting a write to the physical page, and updating the physical page permission setting to not executable if the write is from the analyzed software. The method may still further include the step of updating the physical page status if (i) an instruction related to the physical page is executed, and/or (ii) the physical page permission is set to not executable to indicate it contains or associated with malware.

Programmatic control, including the ability to control page permissions and update page statuses, of the virtual machine may be provided via instrumentation methods such as that described in U.S. Patent Application Ser. No. 61/747,114 (the "'114 Application"), which is incorporated herein in its entirety by reference. In a preferred embodiment of the present inventive concept, a software module such as an analysis engine is configured to carry out the steps of the method disclosed herein.

The method may further include the steps of saving the memory address written to and/or saving the contents of the physical page for review. In embodiments of the invention, the memory address and/or contents of the physical page are saved in and/or for analysis by an analysis engine. The method may further include the step of reading memory allocated for use by a guest virtual machine via a virtual machine introspection tool. This may help to determine if the write to the physical page is from the analyzed software, and/or to determine the memory address of the first physical page that was written to. More than one physical page may be observed without departing from the spirit of the present inventive concept. For example, all of the physical pages associated with the guest machine's virtual address space, or only those allocated for use by the analyzed software, may be enumerated, depending on user preference or parameters.

Still further, because of the dynamic, run-time environment in which the present system and method may be employed, the method may further include the step of updating the physical page(s) under observation and/or the analyzed software upon occurrence of at least one of (i) a change in virtual address space allocation and (ii) cessation of execution of a first piece of analyzed software. One or more of the resulting, updated physical page(s) and/or analyzed software may be the same as the initial physical page(s) and/or analyzed software under analysis, but the updating feature of the present inventive concept helps ensure the germane software is under analysis despite changes in the virtual machine.

The aforementioned may be achieved in another aspect of the present inventive concept by providing a system to de-obfuscate obfuscated malicious software. The system may include an analysis engine operable to update a physical page status and save the physical page status to memory upon the occurrence of at least one of (i) execution of an instruction associated with a physical page, and (ii) setting of a physical page permission to not executable. The analysis engine may be configured to set the physical page permission to not executable based upon data or an instruction received which indicate the potential presence of malware.

Additional aspects, advantages, and utilities of the present inventive concept will be set forth in part in the description which follows and, in part, will be obvious from the description, or may be learned by practice of the present inventive concept.

The foregoing is intended to be illustrative and are not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing FIGURES, wherein:

FIG. 1 is a diagram illustrating an example of a process of the present inventive concept.

The drawing FIGURES do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein. A piece of data or software code is "associated with" or "related to" a physical page in memory if it is saved within that physical page or if that physical page contains data or instructions referring to it.

Many virtualization platforms provide mechanisms to manipulate program behavior of virtual machine guests. These mechanisms, and the components and steps presented herein and in the incorporated references such as instrumentation of execution processes and page permissions, can be used to observe and help understand an internal state of a virtual machine and respond to events in the virtual machine. Utilizing such mechanisms, components and method(s) it is possible to programmatically capture obfuscated executable code of a malicious program after it has been decoded or "unpacked," and before it executes.

This can be accomplished in part through manipulating physical page permissions outside of the guest virtual machine operating system and tracking memory addresses that are written to, for example, during execution within the virtual machine of software that is being analyzed because it is or may comprise malware. The system and method are also operable to keep track of memory addresses associated with subsequent execution of code at the written to physical pages.

Turning to FIG. 1, which illustrates an aspect of the method according to the present inventive concept, at the start of execution of a malicious program, the page permissions of all physical pages within a piece of analyzed software's virtual address space, i.e. those physical that are allocated for use by the analyzed software, are set to not writable. In this manner, writes to those physical pages can be detected. In the preferred embodiment, enumerating the physical pages is accomplished by traversing a page table that defines a virtual to physical memory mapping for the processor.

As discussed in the '114 Application, memory allocated for use by the guest virtual machine may be introspected or read via any number of virtual machine introspection tools. In the preferred embodiment, the method and system of the present inventive concept utilizes the library identified by "LibVMI" to read the memory allocated for use by the guest virtual machine. This is an open source library that provides a mechanism to resolve the virtual to physical page mapping for any process running within a guest virtual machine operating system. While software libraries such as LibVMI are very convenient for this task, this virtual to physical address mapping can be accomplished in a variety of ways without departing from the spirit of the present inventive concept.

In addition, allocation of physical memory space and virtual to physical address mapping, as well as the executing software under analysis, can change over time for example when memory is allocated or de-allocated or a piece of analyzed software stops executing and, as a result, preferred embodiments of the present invention utilize mechanisms for frequent updates. In an aspect of the present inventive concept, the virtual address space and virtual to physical address mapping is updated every time the process or analyzed software changes and/or every time page tables are modified.

In this manner, it is possible to determine what executable code should be under analysis as well as which physical pages of memory contain code interacting with, and that may ultimately perform in conjunction with, the analyzed software. Enumerating what executable code should be under analysis can be accomplished by looking at operating system process tracking structures and/or by matching byte strings contained in the binary executable.

Finally, it should be noted that the virtual memory space is not simply limited to user privilege level processes running underneath an operating system. Rather, the present inventive concept may be used for system level processes and/or as an operating system kernel to analyze software running at any privilege layer.

Returning to description of a method of the present inventive concept, after enumerating all physical pages of memory allocated for use by the analyzed software and that are to be observed, all such physical pages are set to not-writable. In this manner, whenever such regions of memory are written to it will be apparent, preferably through notification to an analysis engine of the present inventive concept.

Programmatic control, for example the ability to control page permissions and update page statuses, may be provided via instrumentation as described in the '114 Application, which among other things allows for registration to receive events such as control register accesses, access violations, single step instructions, and/or INT3, and/or and for modification of guest execution behavior, e.g., by setting page permissions and/or single-stepping mode. In the preferred embodiment of the present inventive concept, the method utilizes a hypervisor virtualization platform such as that sold under the trademark XEN® for x86 architecture. It is foreseen, however, that the present inventive concept may utilize any virtualized environment for such instrumentation, including to instrument memory permissions for physical pages allocated for use by a guest virtual machine.

One of the advantages of the present inventive concept arises from the fact that, in many virtualization platforms that use EPT or hardware-assisted paging, it is not possible for executable code running within the virtual machine to know that physical page permissions are being manipulated. This is because the permissions that are being modified on the actual page permissions reside outside of the virtual machine operating system. Code running within the operating system are given an entirely different set of permissions.

Further, in an aspect of the present inventive concept, if a physical page that is marked not writable is written to, the analysis software engine will be notified of the event. By analyzing memory through virtual machine introspection, for example according to the techniques of the '114 Application, it is possible to determine which code in memory is causing the write and/or which location in memory is being written to. If the write is coming from the piece of analyzed software, then it is preferable to make note of the written to memory address and to carefully track whether code or an instruction at such address is executed. In the instance that code at one or more of these memory addresses are executed, such locations may be identified as de-obfuscated software.

To track execution of code at the memory address(es), their associated physical page permissions are set to not executable and information about those memory addresses which were written to is saved, preferably in the analysis engine. If code in a not-executable physical page is executed, then it will be apparent, preferably through a notification to the analysis engine. It can then be concluded that the physical page(s) contains obfuscated code. According to the present inventive concept, execution of the piece of analyzed software may be instrumented such that, before the first instruction of the newly enumerated de-obfuscated code is executed, it is apparent to the software or user managing execution of the steps of the method, for example through notification to the analysis engine. Because at this point the de-obfuscated code and its location within one or more physical pages has been determined, it is possible to store the contents of all such physical pages and associated information for analysis, preferably prior to actual execution of the de-obfuscated code.

Finally, it should be noted that the present inventive concept is iterative in that it can detect multiple stages of obfuscation. It is common for malware authors to use several layers of encoding to try and hide what their malicious programs are doing. Therefore, the present inventive concept is operable to handle multiple layers of decoding obfuscated executable code. It is operable to track the memory addresses of data and code utilized in conjunction with a piece of analyzed software in a manner sufficient to capture obfuscated code even where the obfuscated code is stored in multiple locations within memory, potentially across several different physical pages.

For example, consider executable code obfuscated in two stages, e.g., obfuscated in binary stored in two different areas of memory. The first stage of de-obfuscation that occurs in conjunction with execution of a piece of analyzed software would occur at a first area of memory, and a first set of malicious code would be unpacked from that area and saved in executable, de-obfuscated format to a second area of memory. The contents of the first area of memory and the second area of memory, and the relevant memory addresses, may be stored according to the present inventive concept, for example at the moment before the first set of unpacked malicious code executes from the second area of memory. Upon execution of this first set of malicious code, a second set of malicious code obfuscated in binary stored in the second area of memory may be unpacked as well and saved into a third area of memory. The contents of the second area of memory and the third area of memory, and the relevant memory addresses, may be saved according to the present inventive concept, for example at the moment before the second set of unpacked malicious code executes from the third area of memory.

In this manner, the present inventive concept is operable to handle multiple layers of decoding obfuscated executable code. It is operable to function on multiple layers of identifying writes to not writable pages and then subsequently identifying executed instructions on not executable pages. There is no limit to the number of cycles in detecting code being decoded.

In this manner, the present inventive concept provides a system and method operable to programmatically perform runtime de-obfuscation of obfuscated software via virtual machine introspection and manipulation of virtual machine guest memory permissions The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method to de-obfuscate obfuscated malicious software code in a virtual machine, the method comprising:
   enumerating a first physical page associated with a virtual address space of a first piece of analyzed software code;
   setting the first physical page to non-writable;
   detecting a write to the first physical page; and
   enumerating a second physical page following (i) a change in virtual address space allocation, and (ii) cessation of execution of the first piece of analyzed software,
   wherein,
      programmatic control of the virtual machine is provided via instrumentation.

2. The method according to claim 1, further comprising:
   saving the write to a memory address of the first physical page.

3. The method of claim 1, further comprising:
   changing the permission of the first physical page to not executable if the write is from the first piece of analyzed software code.

4. The method of claim 3, further comprising:
   executing an instruction associated with the first physical page; and
   updating a status of the first physical page.

5. The method of claim 4, further comprising:
   storing the contents of the first physical page for review.

6. The method according to claim 3, further comprising:
   reading memory allocated for use by the virtual machine via a virtual machine introspection tool to determine if the write to the first physical page is from the first piece of analyzed software code.

7. The method of claim 3, further comprising:
   reading memory allocated for use by the virtual machine via a virtual machine introspection tool to determine a written to memory address of the first physical page.

8. The method of claim 7, further comprising:
   storing the memory address.

9. The method of claim 8, wherein the memory address is stored in an analysis engine.

10. The method of claim 1, further comprising:
    traversing a page table for the enumerating of the first physical page.

11. The method of claim 1, further comprising:
    traversing a page table for the enumerating of the second physical page.

12. The method of claim 1, further comprising:
    enumerating the first piece of analyzed software code by at least one of (i) reviewing process tracking structures and (ii) matching byte strings in binary executable.

13. The method of claim 1, wherein the enumerating of the first physical page, setting the first physical page to non-writable, the detecting of the write to the first physical page, and the enumerating of the second physical page are conducted by an analysis engine.

14. The method of claim 1, further comprising:
    enumerating a second piece of analyzed software following at least one of (i) a change in virtual address space allocation, and (ii) cessation of execution of the first piece of analyzed software.

15. A system to de-obfuscate obfuscated malicious software in a virtual machine, the system comprising:
    an analysis engine configured to update a physical page status and save the physical page status to memory upon an occurrence of at least one of (i) execution of an instruction associated with a first physical page, and (ii) setting of a physical page permission to not executable,
    wherein,
       the analysis engine is configured to enumerate a second physical page following (i) a change in virtual address space allocation, and (ii) cessation of execution of a first piece of analyzed software, and
       programmatic control of the virtual machine is provided via instrumentation.

16. The system of claim 15, wherein the analysis engine is configured to set the physical page permission to not executable based upon data or an instruction received which indicate the potential presence of malware.

17. The system of claim 15, further comprising:
    a virtual machine introspection tool configured to determine if a write to the first physical page is from the first piece of analyzed software code by reading memory allocated for use by the virtual machine.

18. The system of claim 15, further comprising:
    a virtual machine introspection tool configured to determine a written to memory address of a write to the first physical page by reading memory allocated for use by the virtual machine.

19. The system of claim 18, wherein the memory address is stored in the analysis engine.

20. A system for de-obfuscating obfuscated malicious software in a virtual machine, the system comprising:
    a hardware processor; and
    a storage medium communicatively coupled to the processor, the storage medium comprises an analysis engine configured to (a) update a physical page status and save the physical page status upon at least either (i) execution of an instruction associated with a first physical page or (ii) setting of a physical page permission to not executable, and (b) enumerate a second physical page following (i) a change in virtual address space allocation, and (ii) cessation of execution of a first piece of analyzed software.

21. The system of claim 20, wherein the analysis engine is configured to set the physical page permission to not executable based upon data or an instruction received which indicates the potential presence of malware.

22. The system of claim 20, further comprising:
    a virtual machine introspection tool configured to determine if a write to the first physical page is from the first piece of analyzed software code by reading memory allocated for use by the virtual machine.

23. The system of claim 20, further comprising:
a virtual machine introspection tool configured to determine a written to memory address of a write to the first physical page by reading memory allocated for use by the virtual machine.

24. The system of claim 23, wherein the memory address is stored in the analysis engine.

* * * * *